United States Patent
Kesselring et al.

(10) Patent No.: US 8,625,468 B2
(45) Date of Patent: Jan. 7, 2014

(54) SYSTEMS AND METHODS FOR GRANTING FEATURE CONTROL BASED ON USER LOCATION

(75) Inventors: Ana Kesselring, Arvada, CO (US); Renee F. Krahn, Superior, CO (US); William Howard Chriss, Holmdel, NJ (US); Sandra R. Abramson, Freehold, NJ (US); Harsh V. Mendiratta, East Brunswick, NJ (US)

(73) Assignee: Avaya Inc., Basking Ridge, NJ (US)

( * ) Notice: Subject to any disclaimer, the term of this patent is extended or adjusted under 35 U.S.C. 154(b) by 169 days.

(21) Appl. No.: 13/037,079

(22) Filed: Feb. 28, 2011

(65) Prior Publication Data

US 2012/0218919 A1    Aug. 30, 2012

(51) Int. Cl.
*H04L 12/16*    (2006.01)
*H04Q 11/00*    (2006.01)

(52) U.S. Cl.
USPC ............................ 370/259; 370/260; 370/261

(58) Field of Classification Search
USPC ................ 455/404.2, 419, 436, 440; 370/259
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,812,865 A | 9/1998 | Theimer et al. | |
| 6,865,680 B1 | 3/2005 | Wu et al. | |
| 7,099,668 B2 * | 8/2006 | Blitz | 455/440 |
| 7,206,582 B2 * | 4/2007 | Tom et al. | 455/445 |
| 7,653,398 B2 * | 1/2010 | Buckley et al. | 455/456.1 |
| 7,779,072 B2 * | 8/2010 | Donovan et al. | 709/204 |
| 7,830,823 B2 * | 11/2010 | Holloway et al. | 370/260 |
| 7,831,199 B2 * | 11/2010 | Ng et al. | 455/3.06 |
| 8,104,091 B2 * | 1/2012 | Qin et al. | 726/26 |
| 2009/0316688 A1 | 12/2009 | Meenavalli | |
| 2010/0115627 A1 * | 5/2010 | Chow et al. | 726/28 |
| 2012/0169880 A1 * | 7/2012 | Williamson | 348/152 |

* cited by examiner

*Primary Examiner* — Ayaz Sheikh
*Assistant Examiner* — Blanche Wong

(57) ABSTRACT

A communication system comprises a plurality of communication devices and a feature control module. The plurality of communication devices reside at a plurality of locations associated with a user and are operatively associated with a communication network. The feature control module is configured to identify a location of the user, identify at least one of the communication devices at the plurality of locations, and grant feature control for a communication session to at least one communication device based on the identification of the location of the user.

16 Claims, 6 Drawing Sheets

SYSTEMS AND METHODS FOR GRANTING FEATURE CONTROL BASED ON USER LOCATION

TECHNICAL BACKGROUND

Parallel Forking is a feature in SIP (Session Initiation Protocol) that allows a user to be called simultaneously on several SIP-enabled devices. For example, parallel forking may involve simultaneous ringing where a communications network rings all of the communication devices associated with a user, i.e., a user's work, home, cell and any other device associated with the user, at the same time. Accordingly, parallel forking forwards copies of a request to initiate communication to multiple destinations simultaneously.

However, in order to implement parallel forking, each of the communication devices are assigned the same AOR (Address of Record). While sharing the same AOR across multiple devices allows for valuable services like parallel forking, a problem arises related to feature control. Namely, with present approaches there is no way to grant one device control of features compared to the control the other devices are granted. Such features may include the ability to send a call directly to voicemail, or even call forwarding. This is problematic because the end user can only be in one location at a time, even though the user may be logged into multiple devices simultaneously, each device located in different physical areas. The consequence is that an unauthorized user could answer or initiate a call using an endpoint that is logged into by another user and access any of the features normally granted only to the original user.

OVERVIEW

In an embodiment, a method of operating a feature control module within a communications system comprises identifying a location of a user, wherein a plurality of communication devices are associated with the user, identifying at least one of the communication devices in proximity to the location of the user, and granting feature control for a communication session to at least one communication device based on the identification of the location of the user.

In another embodiment, a computer readable includes instructions stored thereon that when executed perform a method for operating a feature control module, the method comprising the steps of identifying a location of a user, wherein a plurality of communication devices are associated with the user, identifying at least one of the communication devices in proximity to the location, and granting feature control for a communication session to at least one communication device based on the identification of the location of the user.

In yet another embodiment, a communication system comprises a plurality of communication devices and a feature control module. The plurality of communication devices reside at a plurality of locations associated with a user and are operatively associated with a communication network. The feature control module is configured to identify a location of the user, identify at least one of the communication devices at the plurality of locations, and grant feature control for a communication session to at least one communication device based on the identification of the location of the user.

DETAILED DESCRIPTION

Systems and methods are provided herein for controlling features on end communication devices according to which communication device is in proximity with the intended user. Exemplary systems and methods grant feature control to selected communication devices based on an inferred presence of the user nearby the selected communication device. In at least one example, feature control is granted to a communication device based on physical activity that indicates presence of the user near the communication device. Such a configuration may allow the system to provide full feature control for a device the user is likely to be using while still allowing a common address of record with multiple other devices registered to the same user.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
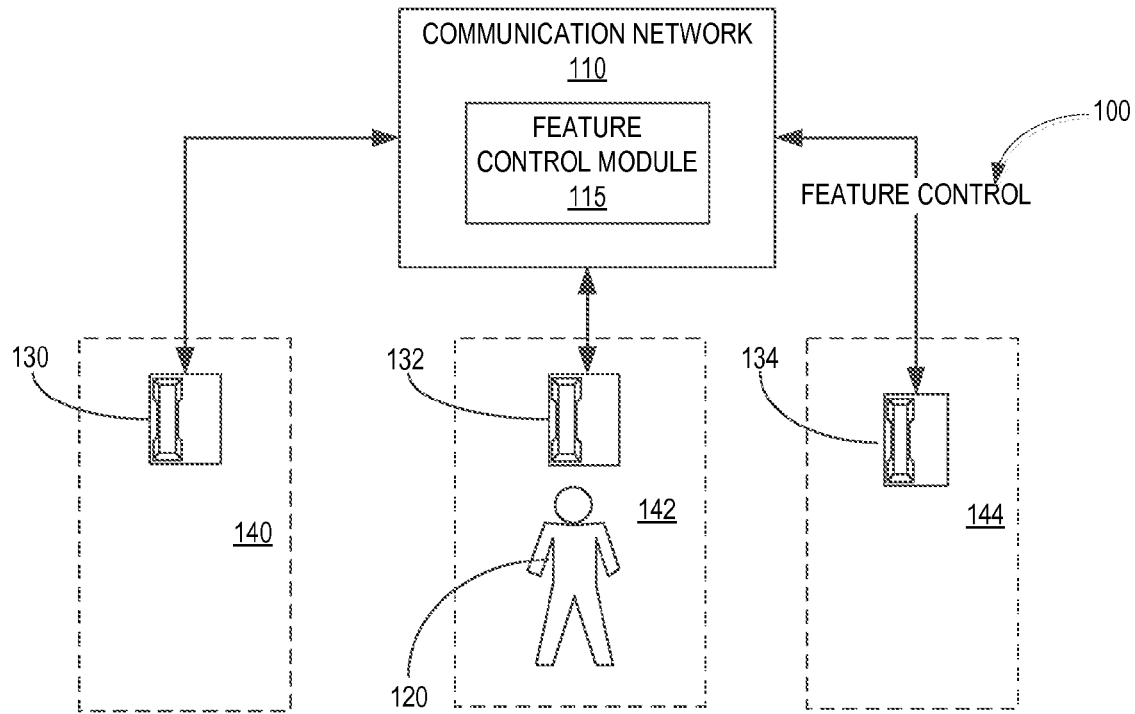
FIG. 1 is a schematic view of a communications system according to one example.

FIG. 1 illustrates a communications system 100 that includes a communications network 110 configured to facilitate a communication session between a user 120 and one or more third parties (not shown). The user 120 may have access to a plurality of communication devices 130, 132, 134 located at a plurality of locations 140, 142, 144. Though shown at fixed locations, it will be appreciated that the locations 140, 142, 144 may be transitory, fixed, or some combination thereof. Further, a number of communication devices may be located at any number of locations.

As will be discussed in more detail hereinafter, the communications system 100 includes a feature control module 115 that is configured to grant feature control to selected communication devices 130, 132, 134 based on proximity of the user 120 to the communication devices 130, 132, 134. Features that may be controlled as described herein may include the ability to send calls directly to voicemail, call forwarding, voicemail features, and other features related to the control or access of a communication session, such as a call. In the illustrated example, the feature control module 115 is implemented in the communication network 110. In other examples, the feature control module 115 may be separate from the communication network, implemented in the communication devices 130, 132, 134, or implemented in some other manner. Proximity of the user 120 to the communication devices 130, 132, 134 may be inferred in several ways, as will also be discussed in more detail herein.

As shown in FIG. 1, the communications network 110 is operatively associated with each of the communication devices 130, 132, 134. In particular, the communications network 110 may be configured to perform the methods shown in FIG. 2A and FIG. 2B.

Figure 2A:
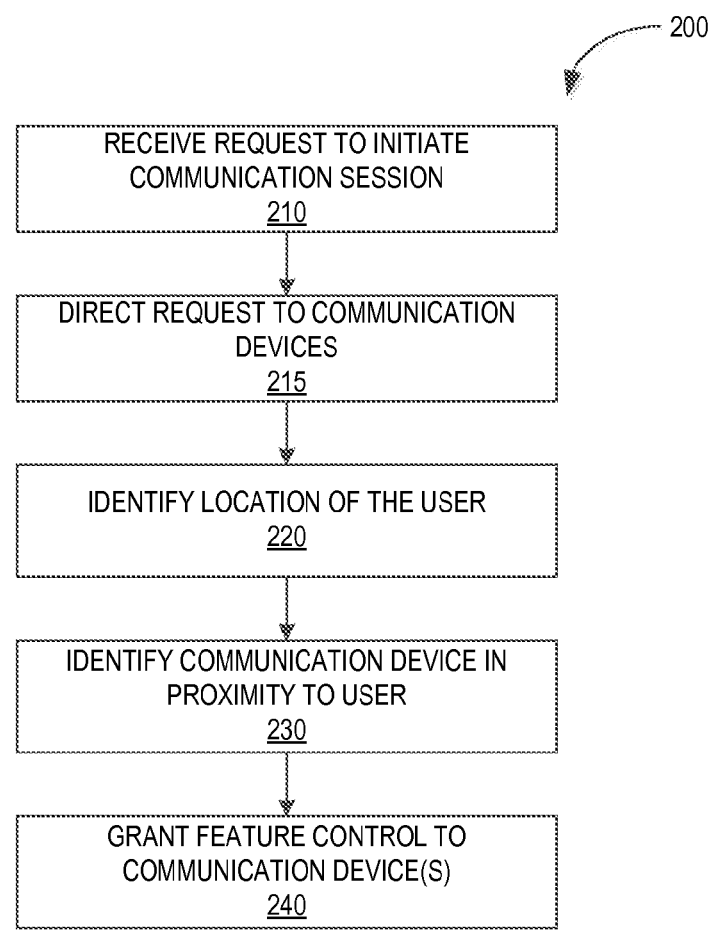
FIG. 2A is a flowchart illustrating a method of operating a communications system according to one example.

FIG. 2A illustrates a method 200 of initially establishing feature control for communication devices associated with a user based on a location of the user. As illustrated in FIG. 2A, the method 200 begins at step 210 when the communications network 110 receives a request to initiate a communications session with the user 120. The request is directed to the communication devices 130, 132, 134 associated with the user 120 at step 215. Steps 210 and 220 may be optional or may be part of an initial process for initially determining to which communication device to grant feature control. It will also be appreciated that the communication session may begin at any point during the method. Further, it will be appreciated that the management of feature control may be performed independently of the actual conduct of the communications session if so desired.

The user 120 may move between any of the locations 140, 142, 144 as the user so desires. Thus, in order to implement parallel forking, it may be desirable to direct the request to a variety of locations but to grant feature control only to a communication device at the location the user is likely present.

Accordingly, the method continues at step 220 when the feature control module 115 identifies a location of the user 120. In one example, the feature control module 115 identifies the location of the user 120 through inferences. In other examples, direct determination of the user's location may be performed. Various processes are described herein for inferring the location of the user 120 as well as for directly determining the user's location. Several exemplary processes will be described in more detail at appropriate points hereinafter.

Figure 2B:
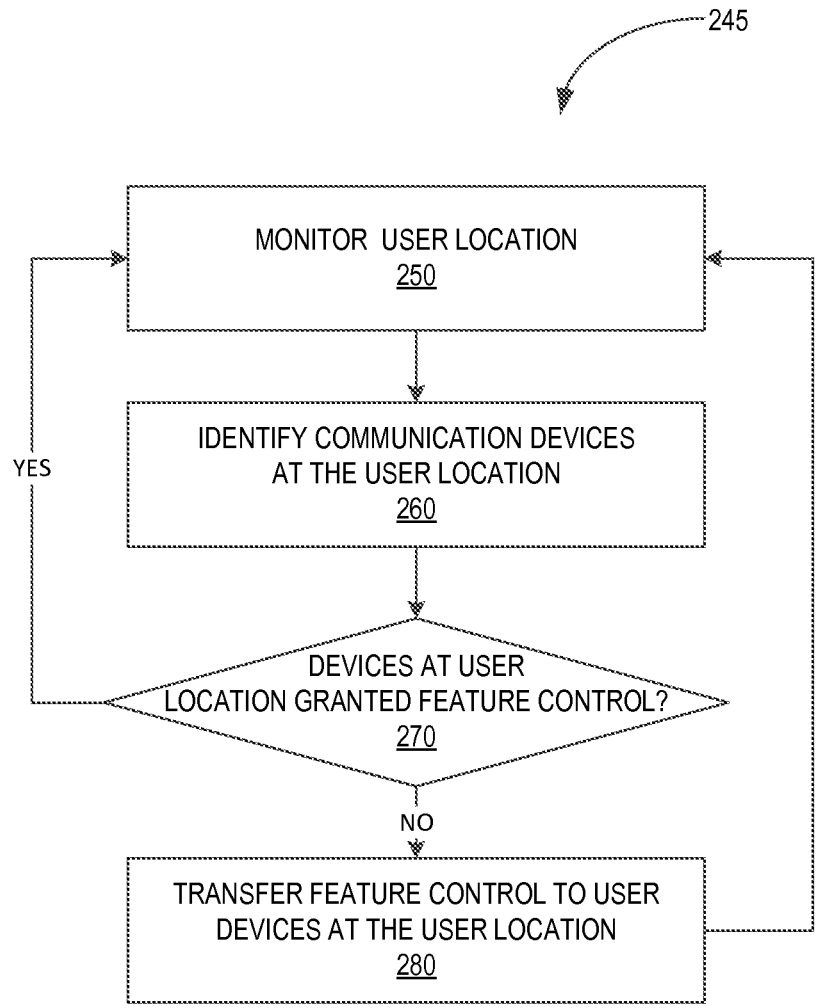
FIG. 2B is a flowchart illustrating a method of operating a communications system according to one example.

In FIG. 1, the communication devices 130, 132, 134 are located at various locations 140, 142, 144. Once the location of the user 120 has been identified, at step 230 at least one of the communication devices in proximity to the inferred location of the user 120 is identified. Thereafter, at step 240 the feature control module 115 grants feature control for communication sessions to selected communication device(s) based on the identification of the inferred location. Accordingly, FIG. 2A illustrates a method of initially establishing feature control for communication devices associated with a user based on an inferred location of the user FIG. 2B illustrates a method 245 of managing feature control among various communication devices 130, 132, 134. Feature control may be granted to the appropriate communication devices 130, 132, 134 in a dynamic manner as the user 120 moves between various locations 140, 142, 144.

In at least one example, determinations as to whether feature control should be granted to a given device may occur independently of requests to initiate communication sessions with the user or even independently of the actual conduct of the communication sessions. In such examples, the communications system 100 may monitor the location of the user at step 250 constantly or periodically. In other examples, monitoring the location of the user 120 according to step 250 may be performed in response to a request to initiate a communication session with the user 120.

In either case, the method 245 also includes identifying communication devices at or near the user's location at step 260. Thereafter, if the communication device(s) at or near the user's location have feature control already granted to them (YES, step 270), the communications system 100 continues to monitor the location of the user 120. If, however, the communication devices at the user's location have not been granted feature control (NO, step 270), at step 280 the communication devices at the user's location are granted feature control. Thereafter, tracking of the location of the user 120 and the feature control status of communication devices at those locations continue as shown.

When a user changes location, that change in location will be noted, communication devices at that location will be identified, and those devices will then be granted feature control. This may occur on an on-going basis. Accordingly, feature control may flow with the location of the user 120 based on inferences about the user's location. Exemplary methods of inferring a user's location will now be described in more detail.

Figure 3A:
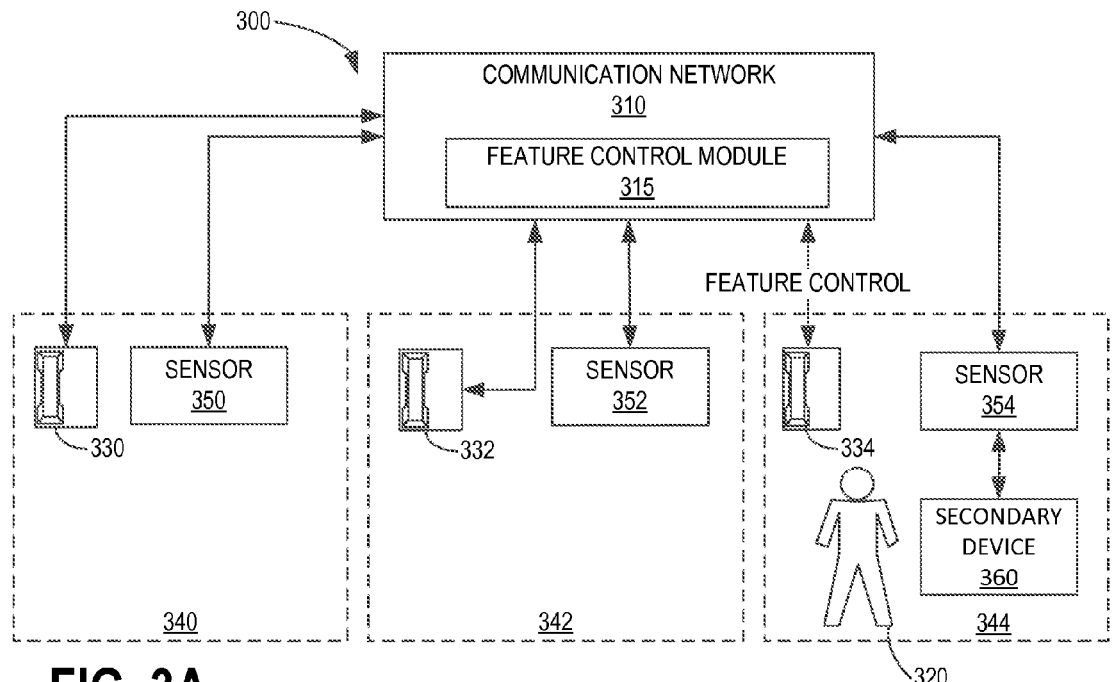
FIGS. 3A-3B illustrate a communications system according to one example.
Figure 3B:
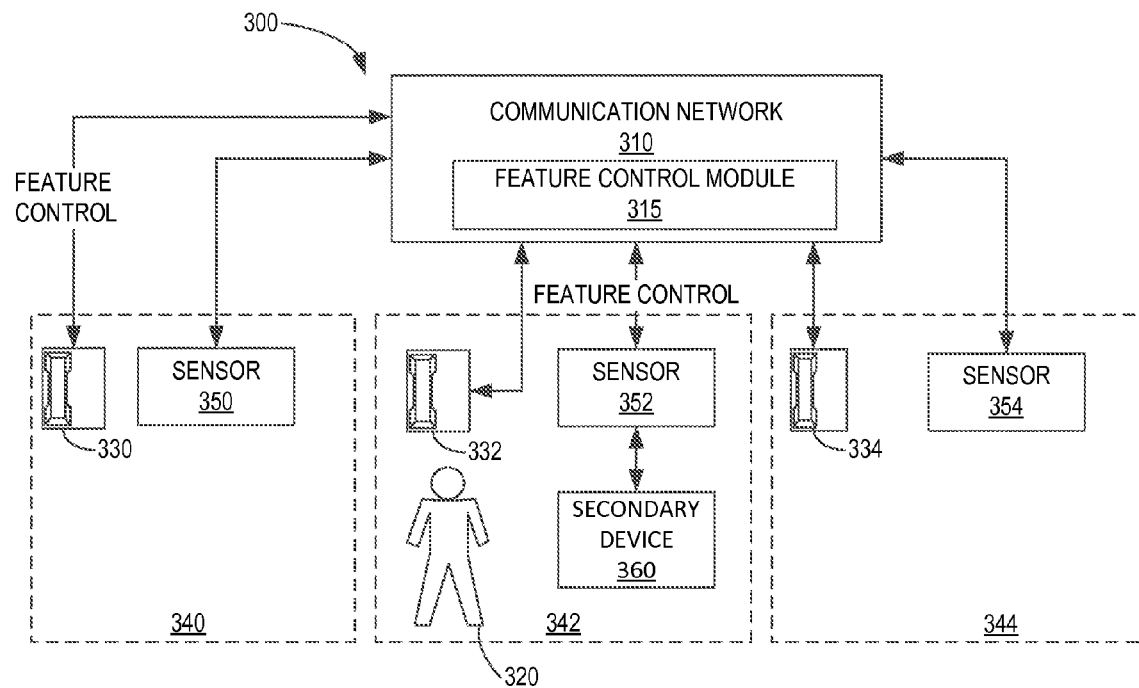

FIGS. 3A and 3B illustrate a communications system 300 that is configured to infer the location of a user 320. As illustrated in FIG. 3, the communications system 300 includes a communications network 310 having a feature control module 315 that is configured to infer the presence of a user at various locations 340, 342, 344, identify which of the communication devices 330, 332, 334 are at the inferred location, and grant feature control to a selected device or devices.

In the example illustrated in FIGS. 3A and 3B, the communications system 300 includes sensors 350, 352, 354 positioned at each of the locations 340, 342, 344 respectively. The sensors 350, 352, 354 may be configured to detect the presence of a secondary device 360 that is usually within the control of the user 320.

For example, the sensors 350, 352, 354 may be configured to detect the presence of devices utilizing short range wireless signals. Exemplary short range wireless signals include wireless devices, such as mobile devices, wireless mobile headsets and other such devices. The sensors 350, 352, 354 may be configured to detect the signals, analyze the signals, and determine whether the secondary device 360 is associated with the user 320. If the sensors 350, 352, 354 detect a signal indicative that the secondary device 360 is a device associated with the user 320, it may be inferred that the user 320 is at the location corresponding to the sensor.

In FIG. 3A, the sensor 354 at location 344 detects the presence of the secondary device 360. In response to the detection of the secondary device 360, the feature control module 315 grants feature control to the communication device 334 at location 344.

The sensors 350, 352, 354 are shown separate from the communication devices 330, 332, 334 for ease of reference. In at least one example, the sensors 350, 352, 354 may be integrated into the communication devices 330, 332, 334. For example, a sensor integrated with a deskphone may detect via short range wireless signals the presence of the user's cell phone or other secondary device. In such an example, the desk phone would then know that the user is likely nearby the desk phone, and can therefore limit feature control to the desk phone for the period of time during which the user is nearby the desk phone. Feature control would be taken away from the other communication devices 330, 332 registered to the same user, while preserving the fundamental benefit of parallel forking.

As shown in FIG. 3B, once the secondary device 360 is moved to a different location, the feature control module 315 withdraws feature control from the communication device 334. Feature control is transferred to the communication device 332 at the location in which the sensor 352 detects the presence of the secondary device 360.

In yet another example, the sensors 350, 352, 354 may be physical buttons on the communication devices 330, 332, 334. In such an example, the sensors 350, 352, 354 may be actuated by the user 320 to indicate presence. This may be appropriate in a scenario whereby the phone is already located in an area linked to a particular user—such as in an office or study. The user 320 could actuate the button to indicate his/her presence nearby the phone. As in the examples above, feature control could be granted to that phone and taken away from other devices. In the illustrated example, the sensors 350, 352, 354 are coupled directly with the communication network 310 and/or the feature control module 315. In other examples, the sensors 350, 352, 354 may be in communication with the communication devices 330, 332, 334 alternatively or in addition to coupling directly to the communication network 310.

In the examples described above, user presence at a location is inferred by detecting the presence of active secondary devices. In yet another example, the secondary device 360 may be a passive secondary device. Passive secondary devices may include credentials, such as badges, radio frequency identification (RFID) tags, and the like. In such an example, the sensors 350, 352, 354 may be a card or badge reader. Such a sensor may be separate from or integrated into the communications 330, 332, 334 as desired. In this example, the user 320 would swipe a badge or card when entering an area, such as a lab, office, or library. Feature control would then be transferred to the phone in that area (this assumes that the user is already logged into that phone). Feature control may then be taken away from other communication devices registered to the same user, while preserving the fundamental benefit of parallel forking.

In any of the cases above, the presence of the user nearby any of the devices may be tracked by the communications network, which maps the AOR to the address of the underlying devices serving the user. Then when features are invoked, the address of the underlying device invoking the feature can be compared to the address of the device granted feature control. Accordingly, FIGS. 3A and 3B illustrate examples in which the presence of a secondary device is detected in order to infer the presence of a user at a plurality of locations.

Figure 4:
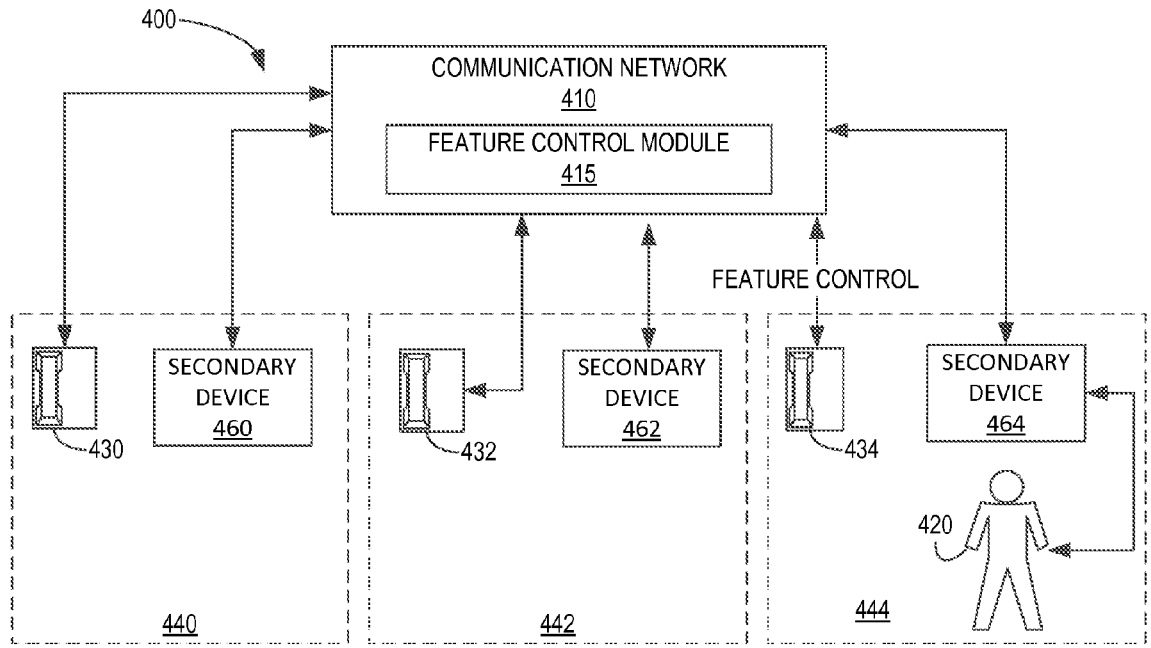
FIG. 4 illustrate a communications system according to one example.

FIG. 4 illustrates a communications system 400 in which a communications network 410 includes a feature control module 415 that grants feature control to various communications devices 430, 432, 434 based on interaction of a user 420 with secondary devices 460, 462, 464 to infer the presence of the user 420 at various locations 440, 442, 444. Exemplary secondary devices include, without limitation peripheral devices such as keyboards, mice, or other devices. In the example shown, when interaction with the secondary device 464 is detected, it may be inferred that the user 420 is present at location 444.

As a result, the feature control module 415 grants feature control to the communication device 434 at the location 444 in which the presence of the user 420 has been inferred and withdraws feature control from the other secondary devices 460, 462. Similarly, the feature control module 415 may grant feature control to secondary devices when the inferred location of the user 420 changes in a similar manner as described above. User interaction with computing devices may also be used to infer the location of a user.

Figure 5:
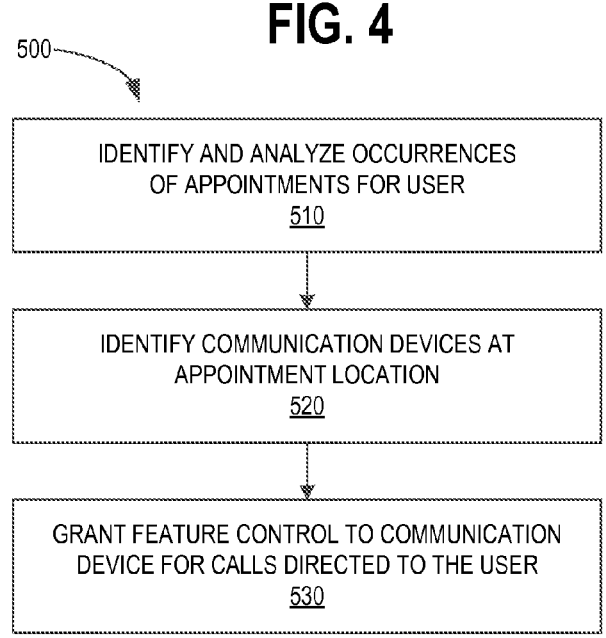
FIG. 5 is a flowchart illustrating a method of operating a communications system according to one example.

FIG. 5 is a flowchart illustrating a method 500 of operating a communications system according to one example. The method begins by identifying and analyzing occurrences of appointments for a user at step 510. In such an example, the communications system may have access to a user's appointment calendar. It will be appreciated that appointments often include information about the time and location of the appointment. Accordingly, analyzing appointments for the user may include identifying the time and location of each of the appointments.

At step 520, the method continues by identifying communication devices associated with the user at the appointment location. If the user is scheduled to be present at a location in which a communication device is located, then at step 530 the method may include granting feature control to the communication device, if any, present at the location of the appointment during the time of the appointment. For instance, if a user's calendar indicates that she is in a lab area, then feature control can be granted to a phone in the lab area.

Figure 6:
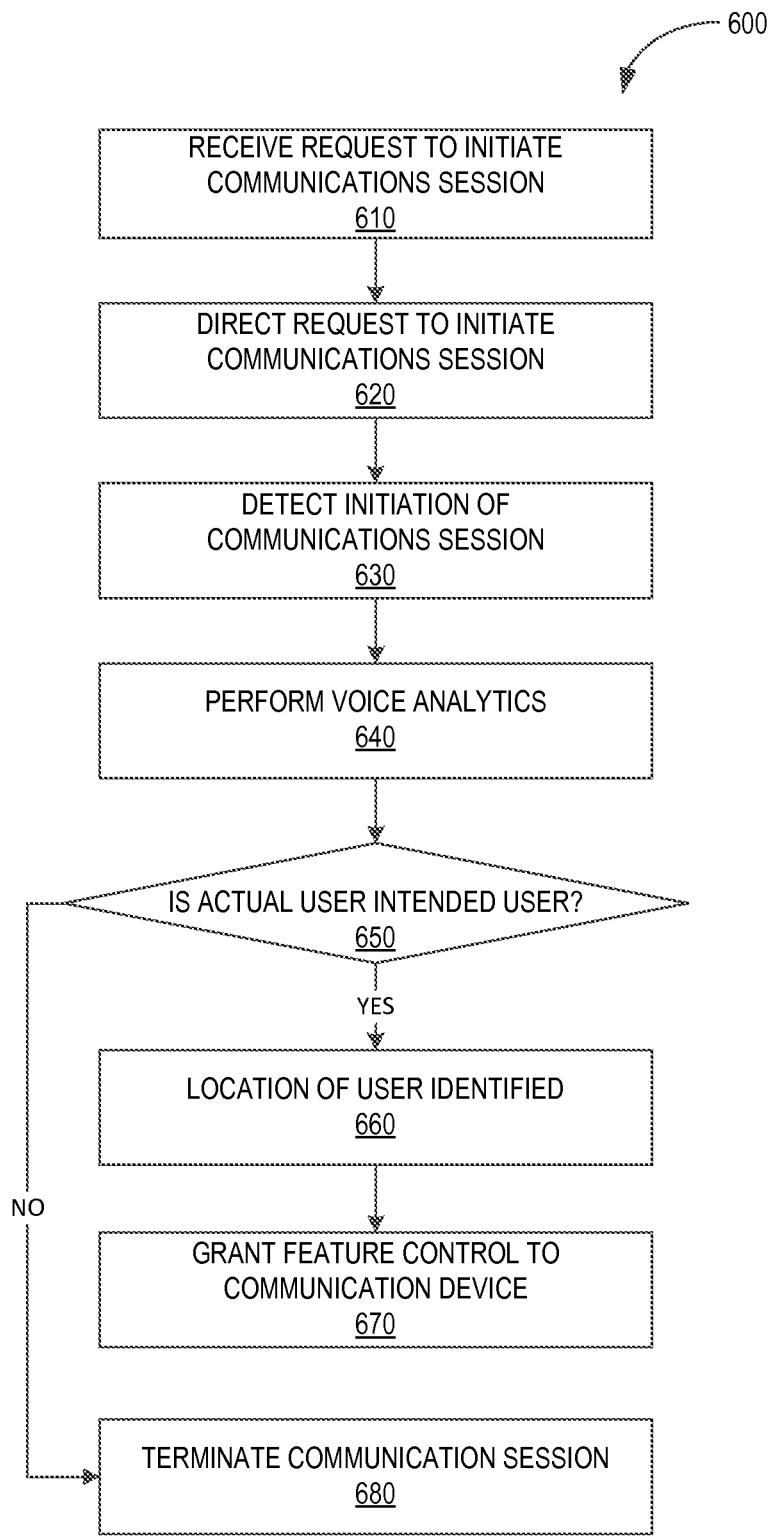
FIG. 6 is a flowchart illustrating a method of operating a communications system according to one example.

To this point, management of feature control has been discussed with reference to methods in which inferences are made about a user's presence at various locations. FIG. 6 illustrates a flowchart of a method 600 of operating a communications system in which a location of the user is determined through voice analysis.

Accordingly, the method 600 begins by receiving a request to initiate a communications session with a user at step 610 and directing the request to communication devices associated with the user at step 620. At step 630 initiation of the communication is detected. For example, the method may include detecting that a phone call has been answered.

At step 640, the method then includes performing voice analytics on the communications session. If the voice analytics indicate the actual user is the intended user (YES, step 650), the location of the user is verified as being near the communication device at step 660 and feature control is granted to the communication device at step 670. If, however, the voice analytics indicate the actual user is not the intended user (NO, step 650) the communications session is terminated at step 680.

Figure 7:
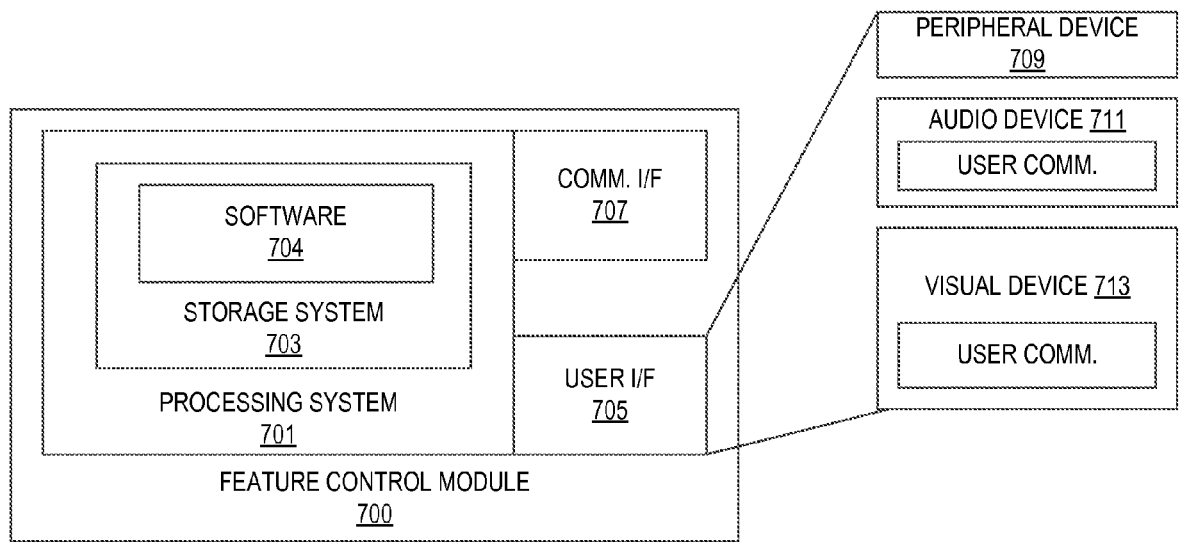
FIG. 7 is a schematic diagram of a feature control module.

FIG. 7 illustrates an exemplary feature control module 700 according to one example. Feature control module 700 may be representative of feature control modules 115, 315, 415. Feature control module 700 includes processing system 701, storage system 703, software 704, user interface 705, and communication interface 707. It should be understood that some elements could be omitted, such as user interface 705. Processing system 701 is linked to storage system 703, user interface 705, and communication interface 707. Storage system 703 stores software 704, executable in operation by processing system 701.

Communication interface 707 comprises a network card, network interface, port, or interface circuitry that allows the feature control module 700 to communicate with communication devices and/or sensors over a variety of networks. Communication interface 707 may also include a memory device, software, processing circuitry, or some other device. Communication interface 707 may use various communication protocols, such as time division multiplex, internet, Ethernet, wireless, or some other communication format—including combinations thereof—to exchange communications as described herein for communication devices.

User interface 705 comprises components that interact with a user and/or other devices to receive inputs and communications and to present media and/or information. User interface 705 may include a speaker, microphone, buttons, lights, display screen, mouse, keyboard, or some other user input/output apparatus—including combinations thereof. In other examples, the user interface 705 may be omitted.

In this embodiment, user interface 705 includes peripheral device 709, audio device 711, and visual device 713. Peripheral device 709 could be any device that can receive or output user communications, such as a keyboard, mouse, or other such device. Likewise, audio device 711 is any device capable of receiving or outputting user communications, such as voice communications. Examples of audio device 711 include speakers, headphones, earphones, and microphones. Visual device 713 is any device capable of displaying images to a user. An example of a visual device 713 is a display screen.

Processing system 701 may comprise a microprocessor and other circuitry that retrieves and executes software 704 from storage system 703. Storage system 703 comprises a disk drive, flash drive, data storage circuitry, or some other memory apparatus. Processing system 701 is typically mounted on a circuit board that may also hold storage system 703 and portions of communication interface 707 and user interface 705.

Software 704 comprises computer programs, firmware, or some other form of machine-readable processing instructions. Software 704 may include an operating system, utilities, drivers, network interfaces, applications, virtual machines, or some other type of software. When executed by processing system 701, software 704 directs processing system 701 to operate the feature control module 700 to perform as described herein for feature control modules 115, 315, and 415.

As is apparent to one skilled in this art, additional variations on this basic invention are possible without departing from the claim scope intended. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above but only by the following claims and their equivalents.

What is claimed is:

1. A method of operating a feature control module among a plurality of communication devices associated with a user, comprising:
    detecting a presence of a secondary device associated with the user to determine a location of the secondary device, wherein the location of the secondary device indicates a location of the user to the feature control module and the secondary device is not one of the plurality of communication devices;
    identifying at least one communication device of the plurality of communication devices associated with the user in proximity to the location of the user;
    granting feature control for a communication session to the at least one communication device of the plurality of communication devices associated with the user in proximity to the location of the user; and
    if the feature control was previously granted to communication devices of the plurality of communication devices associated with the user currently not in proximity to the location of the user, withdrawing the previously granted feature control.

2. The method of claim 1, further comprising receiving a request to initiate the communication session and directing the request to initiate the communication session to the at least one communication device of the plurality of communication devices.

3. The method of claim 1, further comprising determining if the secondary device moves to a different location, wherein the different location of the secondary device indicates a different location of the user to the feature control module; identifying communication devices of the plurality of communication devices associated with the user in proximity to the different location of the user; and responsive to the different location of the user granting feature control to the communication devices of the plurality of communication devices associated with the user in proximity to the different location of the user and withdrawing feature control from communication devices of the plurality of communication devices associated with the user not in proximity to the different location of the user.

4. The method of claim 1, wherein detecting the presence of the secondary device includes detecting short range wireless signals.

5. The method of claim 1, wherein the secondary device comprises a credential associated with the user, wherein detecting the credential is performed by at least one sensor at a known location.

6. The method of claim 5, wherein the credential includes a badge and the at least one sensor includes a badge reader.

7. The method of claim 1, further comprising receiving input via the at least one communication device of the plurality of communication devices associated with the user to determine the location of the user.

8. The method of claim 7, wherein receiving input via the at least one communication device of the plurality of communication devices includes receiving input corresponding to actuation of a button on the at least one communication device of the plurality of communication devices.

9. The method of claim 1, wherein detecting a presence of a secondary device includes detecting activity on the secondary device.

10. The method of claim 9, wherein detecting activity on the secondary device includes detecting typing on a computing device associated with the user.

11. The method of claim 9, further comprising analyzing a calendar associated with the user to determine the location of the user, identifying a location for an appointment in the calendar during a time of the communication session, and identifying communication devices of the plurality of communication devices associated with the user at the location of the appointment.

12. The method of claim 1, wherein further comprising performing speech analytics to confirm an identity of the user to determine the location of the user.

13. A non-transitory computer readable medium having instructions stored thereon that when executed perform a method for operating a feature control module among a plurality of communication devices associated with a user, the method comprising the steps of:
    detecting a presence of a secondary device associated with the user to determine a location of the secondary device, wherein the location of the secondary device indicates a location of the user to the feature control module and and the secondary device is not one of the plurality of communication devices;
    identifying at least one communication device of the plurality of communication devices associated with the user in proximity to the location of the user; and
    granting feature control for a communication session to at least one communication device of the plurality of communication devices associated with the user in proximity to the location of the user; and
    if the feature control was previously granted to communication devices of the plurality of communication devices associated with the user currently not in proximity to the location of the user, withdrawing the previously granted feature control.

14. The non-transitory computer readable medium of claim 13, wherein detecting a presence of a secondary device comprises detecting an activity on the secondary device.

15. The non-transitory computer readable medium of claim 13, further comprising instructions for performing voice analytics to confirm an identity of the user to determine the location of the user.

16. A communication system, comprising:
a plurality of communication devices at a plurality of locations associated with a user and operatively associated with a communication network; and
a feature control module configured to detect a presence of a secondary device associated with the user to determine a location of the secondary device, wherein the location of the secondary device indicates a location of the user from among the plurality of locations, wherein the secondary device is not one of the plurality of communication devices, identify at least one communication device of the plurality of communication devices associated with the user in proximity to the location of the user, grant feature control for a communication session to the at least one communication device of the plurality of communication devices associated with the user in proximity to the location of the user, and, if the feature control was previously granted to communication devices of the plurality of communication devices associated with the user currently not in proximity to the location of the user, withdrawing the previously granted feature control.

* * * * *